2,800,390
PROCESS FOR THE PRODUCTION OF IODIDES AND AMPHOTERIC METAL HYDROXIDES

Abraham Sidney Behrman, Chicago, Ill.

No Drawing. Application September 23, 1954,
Serial No. 457,995

14 Claims. (Cl. 23—89)

This invention relates to the preparation of halogen compounds. It is concerned more particularly with the preparation of halogenates and halides, and specifically with the preparation of iodates and iodides.

The present application is a continuation-in-part of my copending application Serial No. 422,974, filed April 13, 1954. That application describes a process for the preparation of iodates and iodides which comprises typically: (1) reacting elemental iodine with a water-soluble alkaline compound of an alkali metal or an alkaline earth metal in sufficiently concentrated aqueous solution to precipitate a substantial quantity of the iodate formed in the reaction; (2) separating the precipated iodate from the solution; (3) reducing the iodide-iodate solution to iodide with an amphoteric metal selected from the class consisting of aluminum and zinc; and (4) recovering the iodide from the solution.

Several modifications of the process are described in the copending application. Two of these will be mentioned here: (1) The proportions of elemental iodine and alkali in the original reaction mixture may be such that the reduced solution, after contact with the aluminum or zinc, is either alkaline to phenolphthalein indicator, or acid to phenolphthalein but alkaline to methyl orange indicator. (2) When the recovery of iodate is not desired, and the production of iodide is the sole objective, reduction of iodate to iodide by means of aluminum or zinc may be practiced not only on the iodate in the iodate-saturated solution of iodide formed in the original reaction mixture, but also on the precipitated iodate formed in that mixture.

When the proportions of elemental iodine and alkali employed in the initial reaction mixture are such that the solution of iodide, after the reduction with aluminum or zinc, is alkaline to phenolphthalein indicator, there is usually present in the solution a small amount of aluminate or zincate, the amount increasing with increased excesses of alkali. Accordingly, to rid the solution of dissolved aluminum or zinc, the solution is neutralized with an acid to the pH range of minimum solubility of the amphoteric oxide or hydroxide. In the case of aluminum hydroxide, for example, enough of the neutralizing acid is employed to produce a pH range of about 5.3 to 8.0. The aluminum hydroxide precipitated as a result of this pH adjustment is filtered off. Since the pH of the filtrate may now be too low to stabilize the solution against oxidation and attendant loss of iodine, it is generally found desirable to adjust the pH again, this time upwardly, by the addition of an alkali, to a value effective for stabilization, yet still such as will produce in the final dried product a titratable phenolphthalein alkalinity not in excess of the limits prescribed by the United States Pharmacopoeia or other standards.

In the copending application the preferred acid for reducing the pH of the iodide solution to the range of minimum solubility of the amphoteric hydroxide is hydriodic acid; and an especially attractive method is described for preparing the hydriodic acid as needed by passing a solution of the iodide being prepared through a bed of a suitable cation-exchange resin in hydrogen form.

After considerable further research and experimentation I have found that an even more desirable acid to employ for reducing the pH of the iodide solution is carbonic acid. The carbonic acid may be applied in one of several ways, as, for example, by adding the correct amount of a concentrated solution of carbon dioxide of known strength. I prefer, however, to introduce carbon dioxide gas into the iodide solution until the desired reduction of pH is attained.

There are several decided advantages in using carbonic acid in comparison with even the preferred hydriodic acid of the copending application. One of these reasons is economy; carbon dioxide is readily available at a few cents per pound, whereas hydriodic acid, if purchased on the open marget, costs several dollars per pound, and has the additional disadvantage of containing a preservative (usually hypophosphorous acid) which detracts from its purity. Even when the hydriodic acid is prepared as needed by the ion exchange process described in the copending application, there is the cost of the ion exchange plant, the expense of operation (including the cost of labor and of the sulfuric or hydrochloric acid and water used in regeneration), and the inevitable loss of at least a small amount of iodide in the ion exchange step in which hydriodic acid is formed, since attempted recovery of all the iodide would necessitate the use of such a dilute solution of hydriodic acid at the beginning and end of the ion exchange reaction that the volume of solution might be undesirably increased.

A second advantage of the use of carbonic acid over hydriodic acid is that its application is not critical. As a matter of fact, it is usually possible, particularly when aluminum has been employed for reduction, simply to bubble carbon dioxide gas into the iodide solution until the solution is saturated, when it will be found that the pH of the solution is within the desired range of minimum solubility of the amphoteric hydroxide, e. g., the range of about 5.3 to 8.0 in the case of aluminum hydroxide, as previously noted.

This non-critical use of carbonic acid stems from several facts: Carbonic acid is a very weak acid; at 25° C. a saturated solution of carbon dioxide in pure distilled water contains about 1450 mg. carbon dioxide per liter and has a pH of 3.8. In the presence of any alkalinity, however, the pH becomes a function of the alkalinity and free carbon dioxide; if any two of these three factors are known, the third may be calculated. Practically all commercially available water-soluble iodides contain some alkalinity to stabilize them against oxidation and loss of iodine. U. S. P. potassium iodide, for example, is permitted to have as a maximum an amount of phenolphthalein alkalinity such that when 1.0 gram of the iodide is dissolved in 10 ml. distilled water and 0.1 ml. 0.1 normal sulfuric acid is added, no color develops on the addition of a drop of phenolphthalein indicator solution. When the permissible alkalinity in U. S. P. potassium iodide is expressed in terms of the bicarbonate alkalinity which results from treatment with carbon dioxide gas, and when from this alkalinity and the free carbon dioxide (of saturation) is calculated the pH of the solution, it becomes evident why, in many cases, treatment of the iodide solution with carbon dioxide gas simply to saturation will produce a pH environment of about 5.3 to 8.0, the range of minimum solubility of aluminum hydroxide.

A third, and highly important, advantage in the use of carbonic acid is that the reduction of pH to precipitate the amphoteric hydroxide (e. g., aluminum hydroxide) is a transient effect. Once the hydroxide has been precipitated and filtered off, the pH of the solution may be increased simply by removing carbon dioxide. This is normally accomplished without special effort when the solution is evaporated to dryness.

A marked economy resulting from the transient nature of the pH reduction just referred to is the elimination of the subsequent step of adding alkali to the solution to increase the pH for the purpose of stabilization. All that is required is that the alkalinity of the reduced iodide solution before treatment with carbon dioxide is such that the final dried product will comply with U. S. P. or other appropriate requirements. This is frequently entirely feasible simply by selecting the proper proportions of elemental iodine and alkali in the original reaction mixture; if required, however, minor corrections can always be made before or after the treatment with carbon dioxide, using acid or alkali as indicated.

The automatic upward readjustment of pH mentioned above depends on the fact that the carbon dioxide treatment converts any hydroxide or normal carbonate alkalinity in the solution to the bicarbonate form, assuming, as is characteristically the case, that carbon dioxide is added until the solution is no longer alkaline to phenolphthalein indicator (and therefore has a pH of not over about 8.0). When the solution, after the carbon dioxide treatment and separation of the precipitated amphoteric hydroxide, is evaporated to dryness and, if necessary, subsequently heated, the bicarbonate reverts to the normal carbonate form with the release of "half-bound" carbon dioxide.

A fourth advantage accruing from the use of carbon dioxide as compared with a solution of hydriodic acid is that dilution of the iodide solution is avoided and the cost and time of evaporation consequently decreased accordingly.

A fifth advantage in the use of carbonic acid over hydriodic acid is that complete separation of the reduced solution from the unused aluminum, aluminum hydroxide, and other solid particles is less important in the case of carbonic acid. Since hydriodic acid is a strong acid, it is preferred to have the reduced iodide solution substantially free of solid or colloidal materials which might compete with the alkalinity of the solution for the hydriodic acid, even in a heterogeneous system of this sort. Carbonic acid, on the other hand, is too weak an acid to cause concern in this respect. Accordingly, the iodide solution may be treated, if desired, with carbon dioxide in the presence of appreciable amounts of the solid and colloidal materials referred to, making possible in some cases the use of simple decantation instead of a filtration or centrifuging operation.

From the foregoing recitation of the advantages in the use of carbonic acid for adjusting the pH of the reduced iodide solution, it is evident that the objective of the present invention is the improvement of the basic processes of the parent copending application, particularly in respect to efficiency, economy, and convenience of operation.

Having thus described the underlying principles of the present invention, I shall now give several illustrative, but not limiting, examples of its use.

*Example 1.—Preparation of potassium iodate and iodide*

Ten thousand parts by weight of elemental iodine are reacted with 4410 parts potassium hydroxide (100 percent basis) in aqueous solution containing about 441 grams KOH per liter. The potassium hydroxide solution may be prepared conveniently either from the 90 percent solid material or the 45 percent solution now commercially available. Mixture of the reactants usually results in a temperature rise of about 25 to 30° C. A heavy white precipitate of potassium iodate is formed and settles rapidly. After standing long enough for the formation of the iodate and settling of the precipitate to be substantially complete (as, for example, several hours or overnight, which also permits cooling and consequent maximum precipitation of iodate), the precipitated potassium iodate is separated from the solution by filtration or equivalent means. The filtrate, a highly concentrated solution of potassium iodide saturated with potassium iodate, is now treated in a suitable vessel with metallic aluminum, preferably aluminum foil or other form of aluminum having a large amount of surface per unit weight. A considerable excess of aluminum is desirable to facilitate the reduction, in fact, the liquid volume may be more or less filled with particles of aluminum. The reduction may be accompanied by an appreciable temperature rise.

The proportions of potassium hydroxide and elemental iodine employed in this example were such as to leave in the reduced solution, which is definitely alkaline to phenolphthalein, a perceptible though minute amount of potassium aluminate; and, assuming that it is desired to prepare potassium iodide of U. S. P. grade by direct evaporation to dryness, it is considered desirable to remove the dissolved alumina from the solution. Accordingly, the reduced solution, preferably after separation from excess aluminum, aluminum hydroxide, and other solid particles, and which typically may have a pH of about 9 to 10.5, is neutralized to the range of minimum solubility of aluminum hydroxide, which, as already mentioned, is usually taken to be from about pH 5.3 to about 8.0.

According to the improved process of the present invention, I accomplish this pH reduction by passing carbon dioxide gas into the solution until it is no longer alkaline to phenolphthalein indicator solution. A convenient method of accomplishing this result is to saturate the solution with carbon dioxide; the pH of the solution will normally be in the desired range of about 5.3 to 8.0.

The very small amount of aluminum hydroxide which is precipitated as a result of this pH adjustment is readily filtered off. The filtrate will typically have a specific gravity of about 1.60 to 1.65 at 20° C. and will contain about 850 to 900 grams potassium iodide per liter of solution. If relatively pure starting materials have been employed in the preparation, this final solution is a substantially pure solution of potassium iodide and may be evaporated to dryness—that is, without partial crystallization and separation of crystals from mother liquor—to produce a dried product complying with all requirements of U. S. P. grade including those of a minimum assay of 99 percent KI and of maximum phenolphthalein alkalinity as previously discussed. If necessary, the dried product may be further heated to convert any residual potassium bicarbonate to the normal carbonate.

The potassium iodate separated from the original reaction mixture may be washed with a relatively small volume of water, or preferably of saturated potassium iodide solution to displace occluded potassium iodide solution. I have found it readily possible in this way to produce a potassium iodate which, on drying, will assay well over 99 percent $KIO_3$. The spent iodate wash solution may be treated with aluminum in the manner described above to reduce the iodate present to iodide, and the iodide subsequently recovered; or, more economically, the spent iodate wash solution may be used in the preparation of a new batch of reaction mixture, in which case the yield of iodate recovered is appreciably increased. The precipitated and washed iodate may be further purified, if desired, by dissolving in hot water, filtering off insoluble matter, and evaporating the filtrate to dryness.

*Example 2.—Sodium iodate and iodide*

Ten thousand parts by weight of elemental iodine were reacted with 3460 parts by weight of sodium hydroxide of about 97 percent purity (the impurities being mostly water) dissolved in aqueous solution containing about 346 grams of the 97 percent sodium hydroxide per liter. A heavy white precipitate of sodium iodate resulted. After standing overnight, the precipitated sodium iodate was filtered off, washed with a saturated solution of sodium iodide until substantially free from sodium iodide, and dried. The spent sodium iodate wash solution was used to make up a fresh batch of reaction mixture. The original filtrate from the precipitated sodium iodate, consisting essentially of a highly concentrated solution of sodium iodide saturated with sodium iodate, was treated with metallic aluminum according to the procedure described in Example 1. The reduced solution was separated from unused aluminum and other solid particles and then treated with carbon dioxide to reduce the pH to the range of minimum solubility of aluminum hydroxide (i. e., pH 5.3 to 8.0) in the manner described in Example 1. The solution was then separated from the precipitated aluminum hydroxide by filtration and evaporated directly to dryness.

*Examples 3 and 4.—Use of zinc as reducing agent*

The preparations described in Examples 1 and 2 were repeated by the procedures described above, except that zinc was used instead of aluminum to reduce the iodate in the solution separated from the precipitated iodate. The zinc was used in the form of very thin sheet cut into small strips and bent into random shapes providing large surface area per unit weight. The reducing action of the zinc was found to be characteristically slower than that of aluminum. The pH of the reduced solution was adjusted, when required, by treatment with carbon dioxide in the manner previously described, except that carbon dioxide was usually added just to the point of no color development with phenolphthalein indicator, that is, a pH of about 8.0.

*Example 5.—Preparation of barium iodate and iodide*

Six hundred twenty parts by weight $Ba(OH)_2 \cdot 8H_2O$ were dissolved in 1000 parts by weight of water and reacted with 500 parts by weight of elemental iodine. A heavy white precipitate of barium iodate resulted. This was filtered off, washed, and recovered, and the original filtrate from the precipitated barium iodate was treated with metallic aluminum to reduce the small amount of dissolved barium iodate to iodide, in accordance with the general procedures described in Examples 1 and 2. Similarly, the pH of the reduced solution was adjusted with carbon dioxide, the precipitated aluminum hydroxide filtered off, and the barium iodide recovered, following the methods set forth in those examples.

Even when recovery of the iodate is not desired, and when the iodide is the only desired end product, the method of preparation described broadly in the copending parent application, and as improved as described herein, is still applicable. From the standpoint of the present invention, the basic reaction involved may be represented by the typical equation

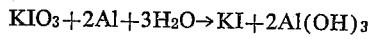

$$KIO_3 + 2Al + 3H_2O \rightarrow KI + 2Al(OH)_3$$

with the provision that the iodide solution, after the treatment with aluminum, be alkaline to phenolphthalein indicator.

The conversion of iodate to iodide illustrated by the equation in the preceding paragraph may be practiced on the iodate at any stage of the process. As already discussed, it may be applied to the iodate in the solution separated from the precipitated iodate in the original reaction mixture, and also to the iodate in the spent iodate wash solution from washing the precipitated iodate. The reduction reaction may also be applied to the precipitated iodate in the original reaction mixture. This may be accomplished either (1) on the entire reaction mixture without separation of the precipitated iodate, in which case I prefer to start with a somewhat more dilute reaction mixture in order to yield after reduction an iodide solution having a concentration about the same as that obtained when the precipitated iodate was separated; or, (2) the precipitated iodate may be separated—and, if desired, washed with saturated iodate solution to remove occluded iodide—and subsequently mixed with sufficient water to provide, after reduction, a solution of the iodide of the desired strength. In either case, in order to facilitate solution and reduction of the solid iodate particles, I have found it desirable to provide for agitation of the mixture and metal, especially until all the iodate has been dissolved. Depending on the purity of the solid iodate, it may be necessary to add a small amount of appropriate alkali (e. g., potassium hydroxide in the case of potassium iodate) to supply the requisite phenolphthalein alkalinity after reduction.

It will be noted that throughout the foregoing discussion it has been stipulated that the alkalinity to phenolphthalein be present in the iodide solution after reduction with aluminum or zinc. This stipulation has been made because in some borderline cases I have found that the iodide-iodate solution may be alkaline to phenolphthalein before reduction, but acid to phenolphthalein after reduction; evidently in these cases there has been a decrease in pH concurrent with the reduction of iodate, though not necessarily causally related to it.

Reference has been made earlier in this specification to the fact that the proportions of elemental iodine and alkali in the original reaction mixture may be taken to yield an iodide solution which, after reduction with the amphoteric metal, is either alkaline to phenolphthalein indicator, or acid to phenolphthalein but alkaline to methyl orange. Each procedure has certain operational advantages, and each may be found especially attractive in particular situations. The improvement provided by the present invention, however, increases the desirability of the alkaline-to-phenolphthalein condition, since, if the reactants in the original reaction mixture are properly proportioned, any subsequent pH adjustment, apart from that provided transiently by the carbon dioxide treatment, may be eliminated. At the same time, the benefit is obtained of two advantages inherent in the alkaline-to-phenolphthalein condition during reduction, namely, (1) a generally considerably shorter time of reduction, and (2) the formation of the aluminum hydroxide resulting from the reduction in dense, almost granular, and readily filterable and washable particles, contrasted with the voluminous, flocculent particles which tend to form when the solution is acid to phenolphthalein but alkaline to methyl orange.

The modifications and ramifications of the basic processes of the parent copending application as improved by the present invention together with variants of the present invention which will suggest themselves to one skilled in the art are considered to be comprehended within the scope of the invention as defined in the claims.

I claim:

1. In a process for preparing iodides from iodates of the alkali metals and alkaline earth metals, wherein the iodates are reduced to iodides with an amphoteric metal selected from the class consisting of aluminum and zinc in the presence of water and of sufficient alkali to make the resultant iodide solution alkaline to phenolphthalein, and amphoteric hydroxide is precipitated from the iodide solution on reducing the pH of the solution by means of an acid to the range of minimum solubility of the amphoteric hydroxide and separating the precipitated amphoteric hydroxide from the solution before recovering the iodide from the solution, the improvement which comprises accomplishing the said pH reduction by treating the solution with carbonic acid in sufficient amount to effect the desired pH reduction.

2. In a process for preparing iodides from iodates of the alkali metals and alkaline earth metals, wherein the iodates are reduced to iodides with an amphoteric metal selected from the class consisting of aluminum and zinc in the presence of water and of sufficient alkali to make the resultant iodide solution alkaline to phenolphthalein, and amphoteric hydroxide is precipitated from the iodide solution on reducing the pH of the solution by means of an acid to the range of minimum solubility of the amphoteric hydroxide, the improvement which comprises accomplishing the said pH reduction by treating the solution with carbonic acid in sufficient amount to effect the desired pH reduction, separating the precipitated amphoteric hydroxide, and evaporating the solution to dryness.

3. A process for preparing iodates and iodides which comprises reacting elemental iodine with a water-soluble hydroxide selected from the group consisting of the water-soluble alkali metal and alkaline earth metal hydroxides in sufficiently concentrated aqueous solution to precipitate a substantial quantity of the iodate formed in the reaction and in proportions producing a reaction mixture alkaline to phenolphthalein indicator, separating the precipitated iodate from the solution, reducing the iodate in the iodide-iodate solution with an amphoteric metal selected from the group consisting of aluminum and zinc, separating the solution, treating the solution with an amount of carbonic acid sufficient to reduce the pH to the range of minimum solubility of the amphoteric hydroxide, separating precipitated amphoteric hydroxide from the solution, and recovering iodide from the solution.

4. A process for preparing iodates and iodides which comprises reacting elemental iodine with a water-soluble hydroxide selected from the group consisting of the water-soluble alkali metal and alkaline earth metal hydroxides in sufficiently concentrated aqueous solution to precipitate a substantial quantity of the iodate formed in the reaction and in proportions producing a reaction mixture alkaline to phenolphthalein indicator, separating the precipitated iodate from the solution, reducing the iodate in the iodide-iodate solution to iodide with an amphoteric metal selected from the group consisting of aluminum and zinc, separating residual solid particles from the solution, treating the solution with an amount of carbonic acid sufficient to reduce the pH to the range of minimum solubility of the amphoteric hydroxide, separating precipitated amphoteric hydroxide from the solution, and evaporating the solution to dryness.

5. A process according to claim 1 in which the carbonic acid is supplied to the solution by saturating the solution with carbon dioxide gas.

6. A process according to claim 3 in which the amphoteric metal is aluminum, and the pH of the reduced solution is lowered to the range of about 5.3 to 8.0.

7. A process for converting solid iodates of the alkali metals and alkaline earth metals to iodides which comprises adding to the iodate sufficient water to dissolve the resultant iodide and sufficient alkali to render the solution alkaline to phenolphthalein after reduction, contacting the mixture with an amphoteric metal selected from the class consisting of aluminum and zinc until the reduction of the iodate to iodide is complete, treating the reduced solution with sufficient carbonic acid to reduce the pH to the range of minimum solubility of the amphoteric hydroxide, separating the precipitated amphoteric hydroxide from the solution, and recovering iodide from the solution.

8. A process according to claim 7 in which the amphoteric metal used for reducing the iodate to iodide is aluminum and the pH of the resultant iodide solution is reduced by treatment with carbonic acid to the range of about 5.3 to 8.0.

9. A process according to claim 7 in which the solid iodate is potassium iodate and the alkali added to produce phenolphthalein alkalinity is selected from the group consisting of potassium hydroxide and potassium carbonate.

10. A process according to claim 7 in which the solid iodate is sodium iodate and the alkali added to produce phenolphthalein alkalinity is selected from the group consisting of sodium hydroxide and sodium carbonate.

11. A process for preparing potassium iodate and iodide which comprises reacting elemental iodine with potassium hydroxide in sufficiently concentrated aqueous solution to precipitate a substantial quantity of the potassium iodate formed in the reaction and in proportions producing a reaction mixture alkaline to phenolphthalein indicator, separating the precipitated iodate from the residual iodide-iodate solution, reducing the iodate in said solution to iodide by contacting the solution with an amphoteric metal selected from the group consisting of aluminum and zinc, treating the resulting iodide solution with carbonic acid in an amount sufficient to reduce the pH of the solution to the range of minimum solubility of the amphoteric hydroxide, separating the precipitated amphoteric hydroxide from the solution, and recovering potassium iodide from the solution.

12. A process according to claim 11 in which the amphoteric metal utilized for the reduction of the iodate is aluminum, and the pH of the reduced solution is lowered to the range of 5.3 to 8.0 with carbonic acid.

13. A process for preparing sodium iodate and iodide which comprises reacting elemental iodine with sodium hydroxide in sufficiently concentrated aqueous solution to precipitate a substantial quantity of the sodium iodate formed in the reaction and in proportions producing a reaction mixture alkaline to phenolphthalein indicator, separating the precipitated iodate from the residual iodide-iodate solution, reducing the iodate in said solution to iodide by contacting the solution with an amphoteric metal selected from the group consisting of aluminum and zinc, treating the resulting iodide solution with carbonic acid in an amount sufficient to reduce the pH of the solution to the range of minimum solubility of the amphoteric hydroxide, separating the precipitated amphoteric hydroxide from the solution, and recovering sodium iodide from the solution.

14. A process according to claim 13 in which the amphoteric metal utilized for the reduction of the iodate is aluminum, and the pH of the reduced solution is lowered to the range of 5.3 to 8.0 with carbonic acid.

References Cited in the file of this patent

J. W. Mellor's "A Comprehensive Treatise on Inorganic and Theoretical Chemistry," vol. 2, 1922 Ed., pages 332, 334, 596, 598 and vol. 5, page 207. Longmans, Green and Co., N. Y.